UNITED STATES PATENT OFFICE.

GEORGE BLOOM VAN BRUNT, OF SAN FRANCISCO, CALIFORNIA, ASSIGNOR TO HARMON JOHN TILDEN, OF SAME PLACE.

IMPROVEMENT IN PROCESSES OF MANUFACTURING PRODUCTS FROM ANIMAL FATS.

Specification forming part of Letters Patent No. 155,816, dated October 13, 1874; application filed January 31, 1874.

*To all whom it may concern:*

Be it known that I, GEORGE BLOOM VAN BRUNT, of the city and county of San Francisco, and State of California, have invented Improvements in the Manufacture of Products from Animal Fat, of which the following is a specification:

It is a well-known fact that all animal fats contain a valuable nourishing substance, together with a valuable article for illuminating purposes.

Many attempts have heretofore been made to produce these articles at a small cost by extracting from the original fatty tissue all the above-named products it may contain.

After repeated experiments I have fully succeeded in solving the problem.

The following is the manner in which I operate: Hashed fat, mixed with or without water, is heated to a temperature 200° Fahrenheit, which temperature keeps fatty substances perfectly sweet, providing, however, that a mixture of two-thirds ($\frac{2}{3}$) of caustic potash and one-third ($\frac{1}{3}$) of carbonate of soda are added to said fat in the proportion of from five to ten per cent., which operates as a partial saponifier and separates all the substances which fat contains from the membrane or scrap in the short time of one hour, treating at 200° Fahrenheit, and obtain these products in a perfectly odorless and sweet state. Further, in order to thoroughly separate from products so obtained in a pure and smooth state the oily parts from the hard parts, and then entirely prevent the grain or granulation which is so injurious to said oil when not extracted, I add to the hashed fatty substances (three-fourths of an hour after they have been treated with or without water, in addition to the alkaline mixture above mentioned in proportion of from five to ten per cent.) two per cent. of extra glycerine, the result being a production of an article which, when subjected to hydraulic pressure, at a temperature of 90° Fahrenheit, gives in liquid from press an entirely new and sweet compound, which never granulates, and which is pure oleopalmitine, and the residuum of the press being pure stearine.

The oleopalmitine can be used for cooking and table use, for lubricating purposes where fine oil is needed, for perfumery, and for the manufacture of butter.

I do not claim, broadly, the separation of oil and fats from suets at a low temperature, as that is not my invention; nor do I claim, broadly, the employment of alkaline carbonates dissolved and put in contact with fatty matters, which it is proposed to melt or purify; but

I claim and desire to secure by Letters Patent of the United States—

1. The process herein described of extracting from fresh raw and hashed animal fats all the fatty matters they contain in a perfectly sweet state by adding a small quantity of caustic alkalies during the first period of the melting process of such fats, thus producing slight saponification which mechanically starts the melting, while the entire process is carried on at from 110° to 200° Fahrenheit, substantially as set forth.

2. The method of producing oleopalmitine chemically free from stearine by the addition, during the process of melting the fat, of a certain proportion of glycerine, substantially as set forth.

GEORGE BLOOM VAN BRUNT. [L. S.]

Witnesses:
D. K. SWIM,
HENRY PHILLIPS.